(12) United States Patent
Rigney et al.

(10) Patent No.: US 7,251,095 B1
(45) Date of Patent: Jul. 31, 2007

(54) METHOD AND APPARATUS FOR PERFORMING BEST HEAD DETECTION IN A DISK DRIVE USING REFERENCE TRACKS

(75) Inventors: Brian Rigney, Louisville, CO (US); Jason Laks, Boulder, CO (US); Todd Franks, Berthoud, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/860,603

(22) Filed: Jun. 2, 2004

Related U.S. Application Data

(60) Provisional application No. 60/475,113, filed on Jun. 2, 2003, provisional application No. 60/475,141, filed on Jun. 2, 2003.

(51) Int. Cl.
*G11B 21/02* (2006.01)
(52) U.S. Cl. .............................. 360/75; 360/31; 360/61
(58) Field of Classification Search .................. 360/31
See application file for complete search history.

(56) References Cited

U.S. PATENT DOCUMENTS 5,668,679 A * 9/1997 Swearingen et al. .......... 360/75
5,946,153 A * 8/1999 Emo et al. .................... 360/31
6,005,725 A * 12/1999 Emo et al. .................... 360/31
6,118,614 A * 9/2000 Lee ............................... 360/75

OTHER PUBLICATIONS

U.S. Appl. No. 10/788,242, filed Feb. 26, 2004, Hartman et al.
U.S. Appl. No. 10/859,916, filed Jun. 2, 2004, Rigney et al.

* cited by examiner

*Primary Examiner*—Andrea Wellington
*Assistant Examiner*—Dan I Davidson
(74) *Attorney, Agent, or Firm*—Westman, Champlin & Kelly, P.A.

(57) ABSTRACT

The present invention is directed to a method and apparatus for performing best head detection in a disk drive using reference tracks. In one embodiment, a disk drive includes a plurality of disk surfaces. Each disk surface has a read head and a write head associated therewith. A servo track writer is provided for moving each write head and each read head relative to their corresponding disk surfaces. Reference tracks are written onto each of the disk surfaces. The reference track from each disk surface is read by its corresponding read head to determine a best read head. In one embodiment, the servo track writer sweeps each read head across its corresponding reference track as the reference track is being read. In one embodiment, each reference track includes reference track patterns and the best read head is the read head that detects the most patterns.

50 Claims, 14 Drawing Sheets

Reference track correction applied to spiral servo loop

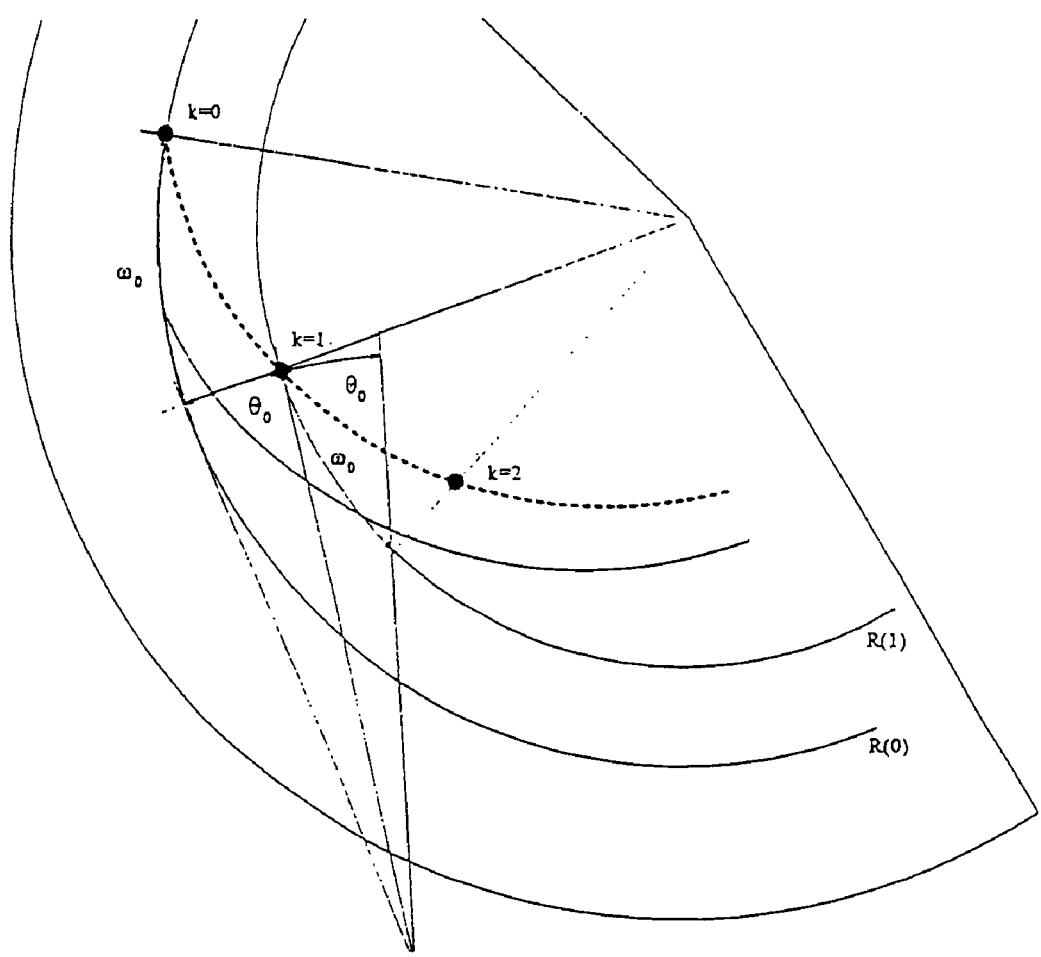
FIG. 6 : Spiral prescribed as a function of sample hit with actuator at sample k = 1

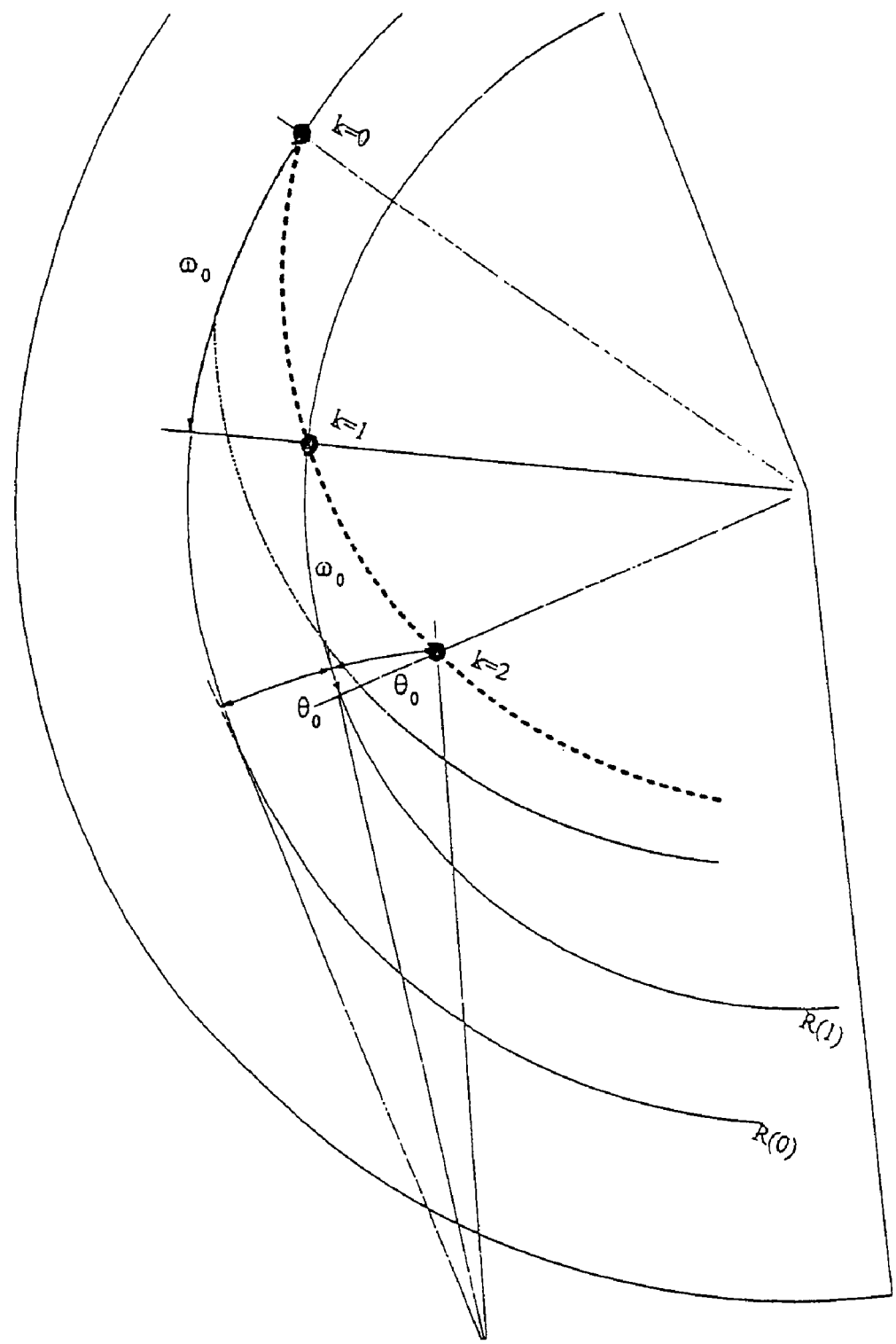
FIG. 7 : Spiral prescribed as a function of sample hit with actuator at sample k = 2

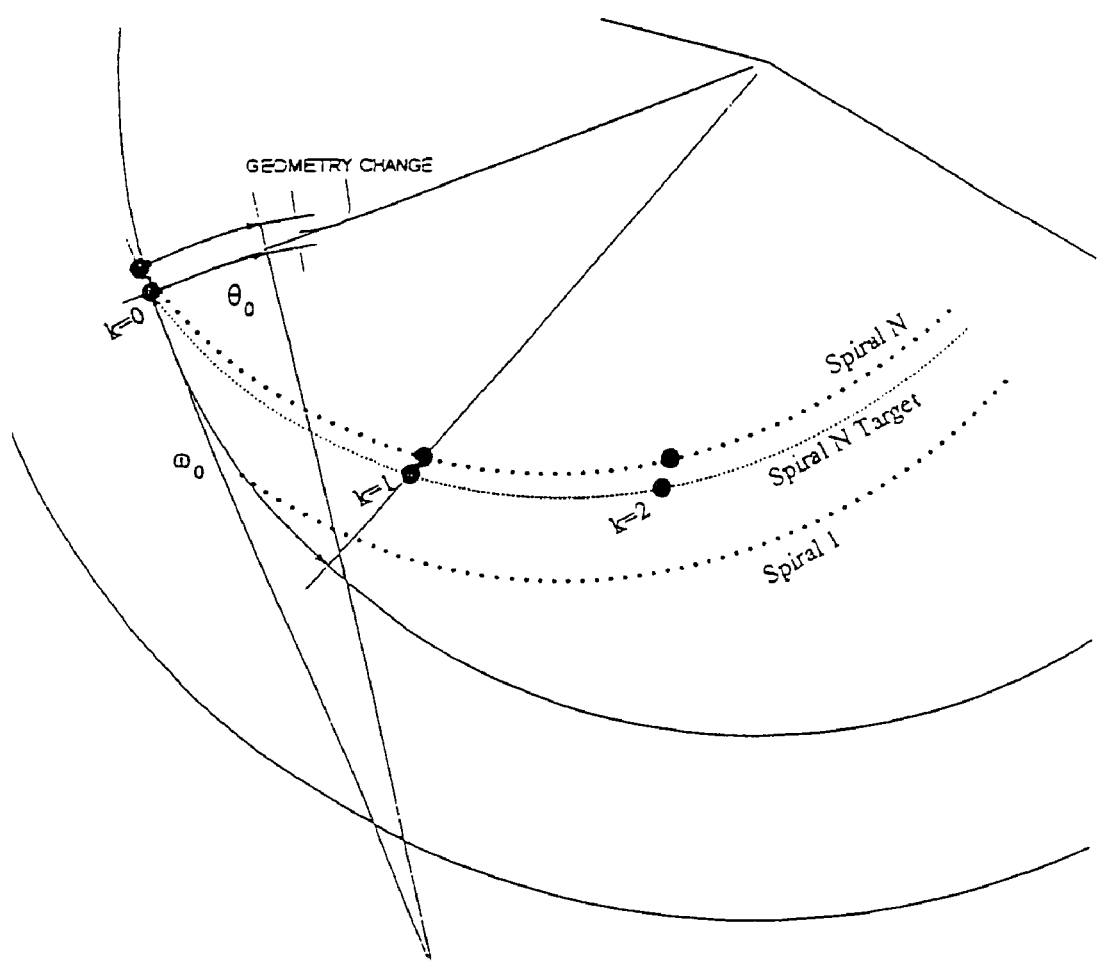
FIG. 8 : Spiral spacing error due to geometric change in actuator pivot to gap distance

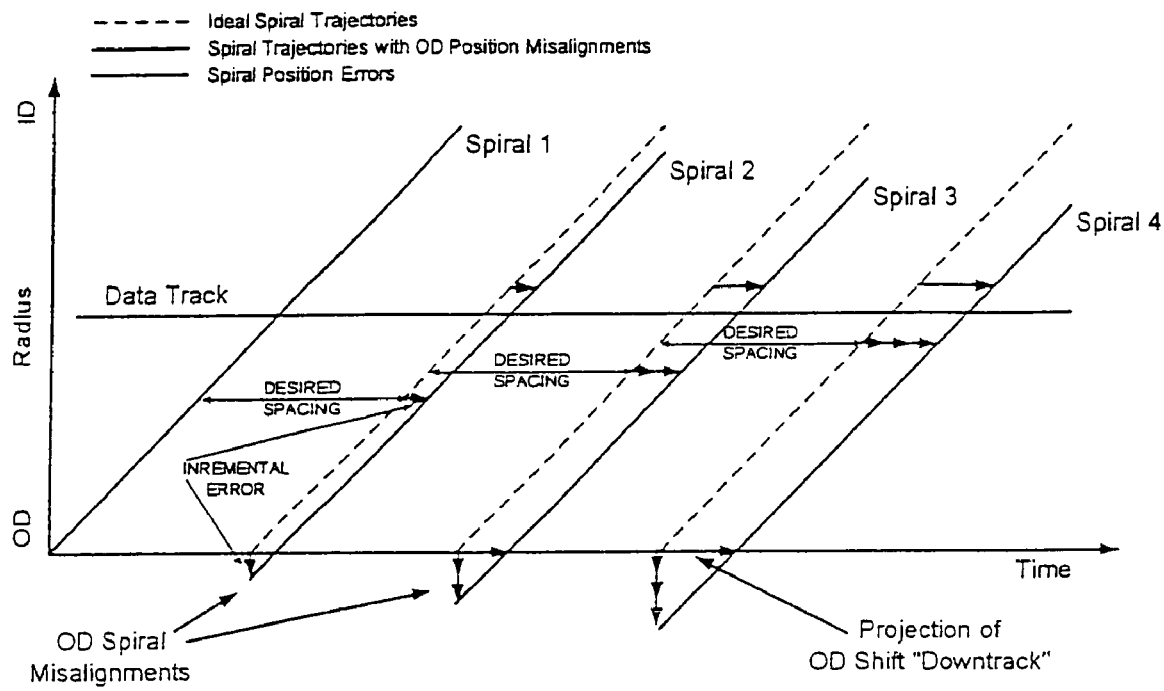
FIG. 9 : Spiral position error due to OD misalignment of spirals
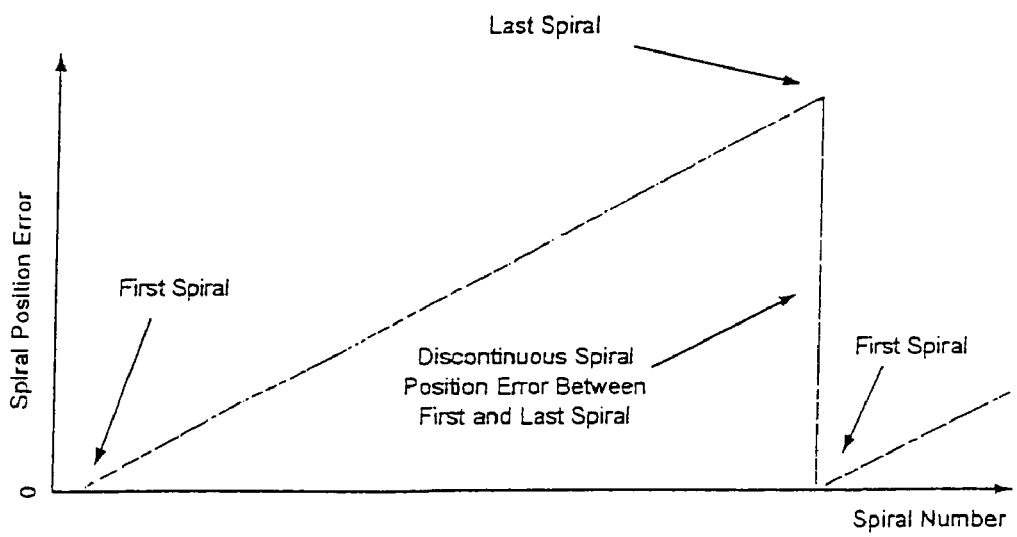
FIG. 10 : Spiral runout Due to OD accumulation of alignment error

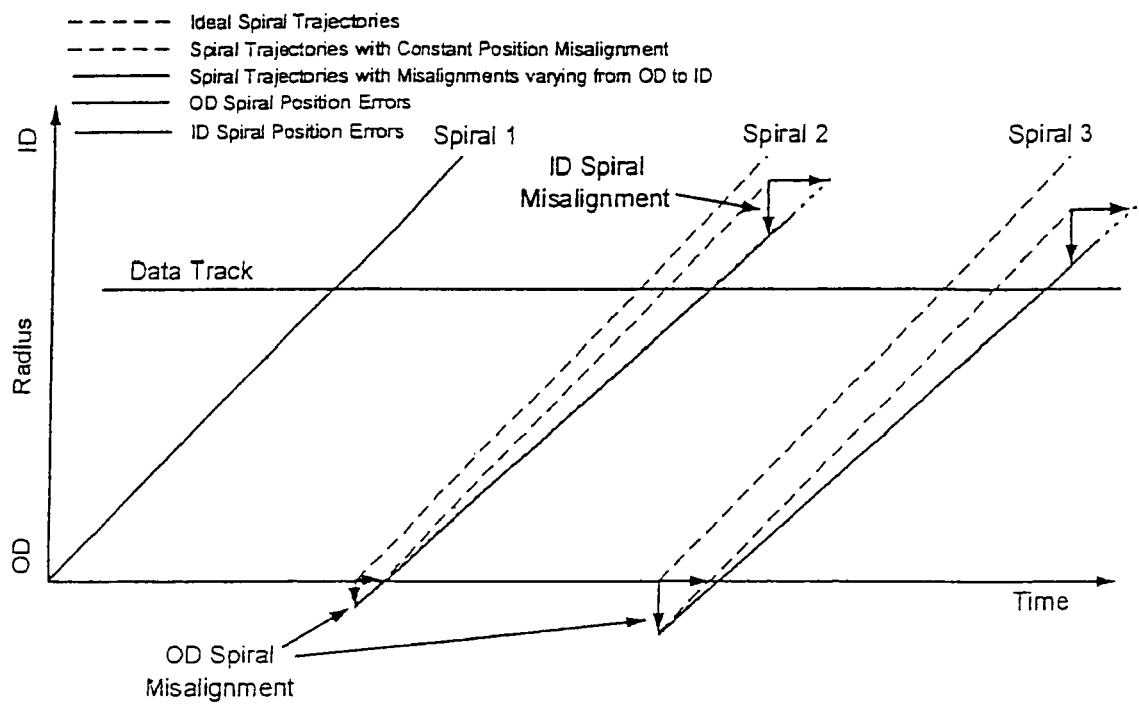
FIG. 11 : Spiral position error due to OD and ID misalignment of spirals
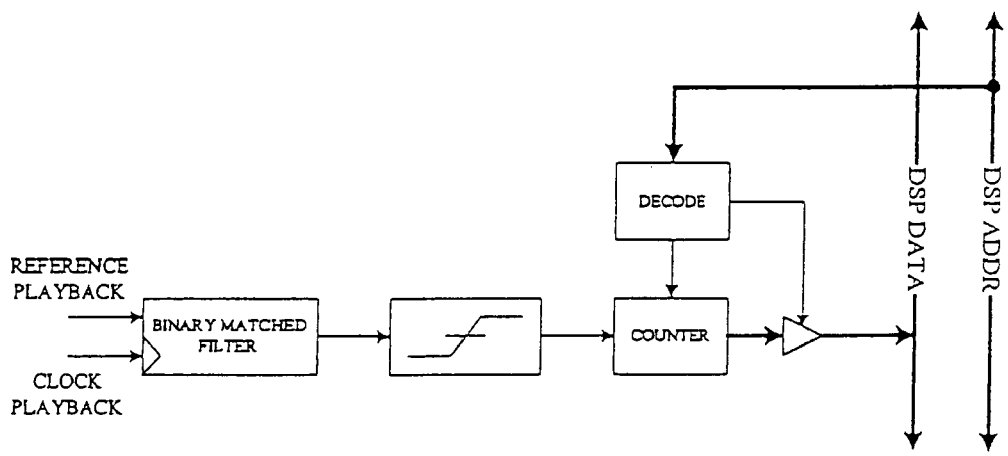
FIG. 12 : Reference track pattern demodulation circuit

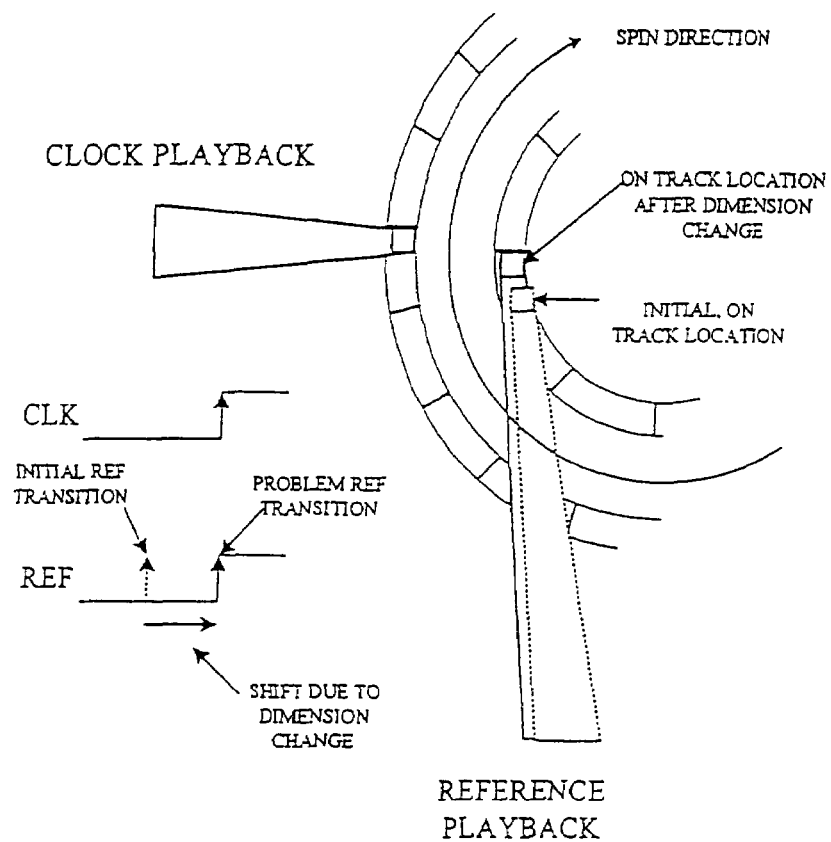
FIG. 13 : Reference track distortion due to geometric change in actuator pivot to gap distance
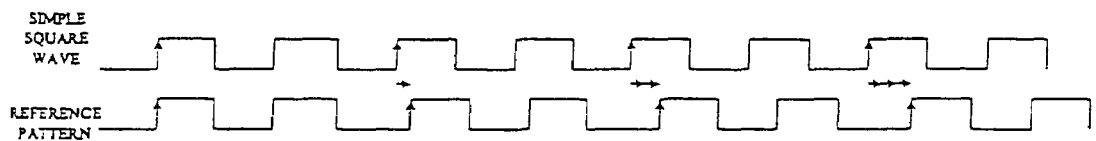
FIG. 14 : Modified reference track pattern

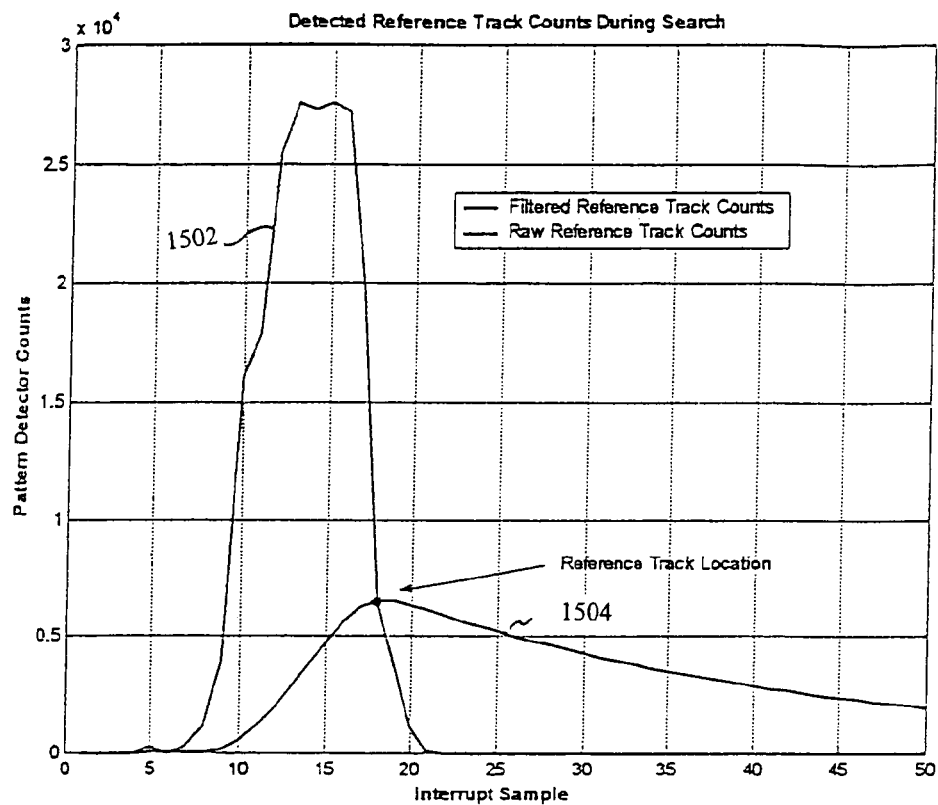
FIG. 15 : Detected reference track counts during search
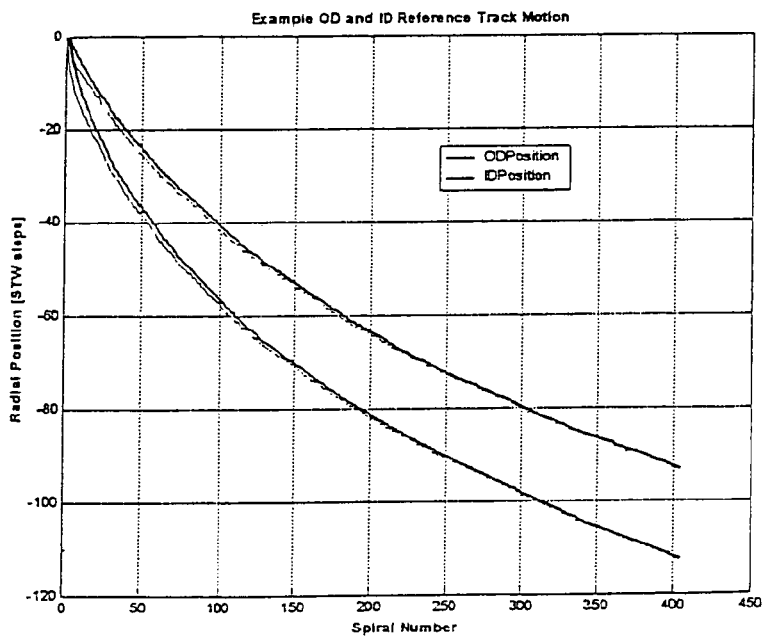
FIG. 16 : Example OD and ID reference track motion

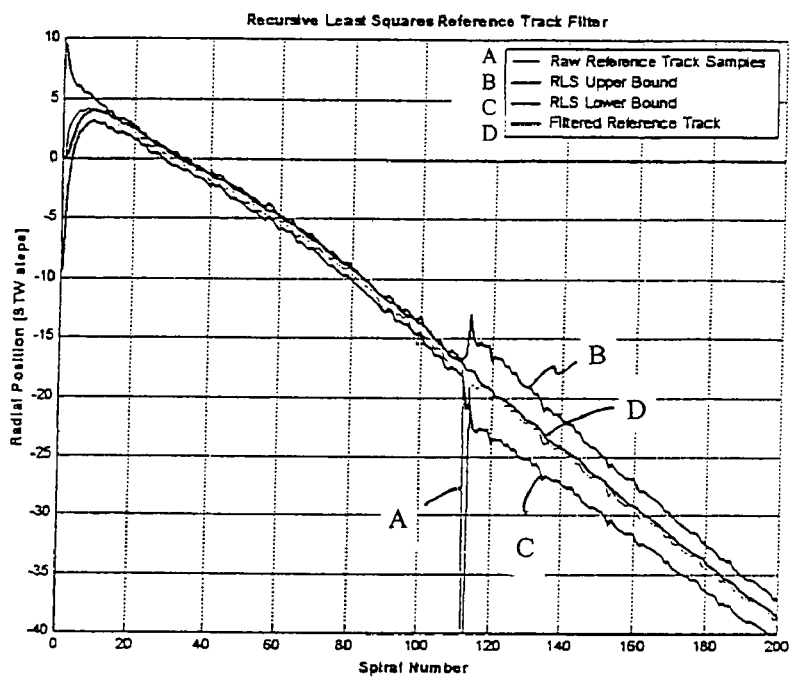
FIG. 17 : RLS reference track filter acting on a noisy data set
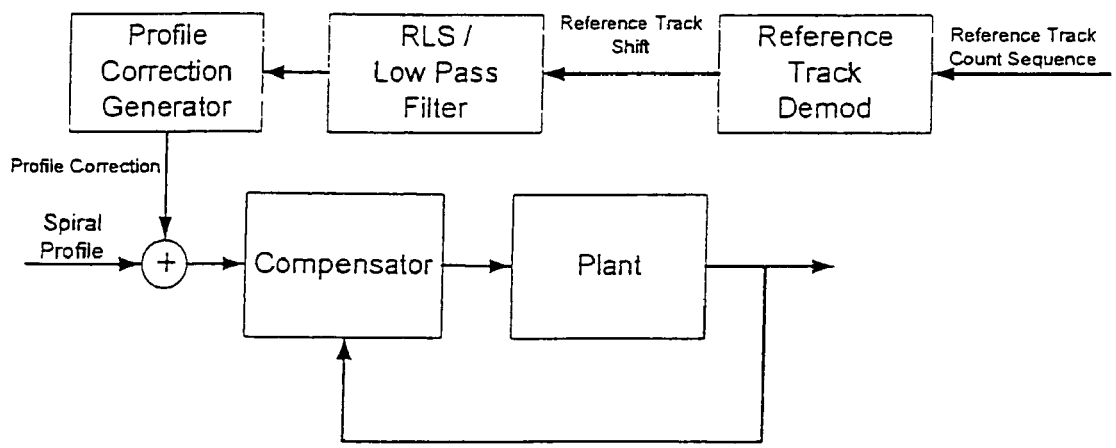
FIG. 18 : Reference track correction applied to spiral servo loop

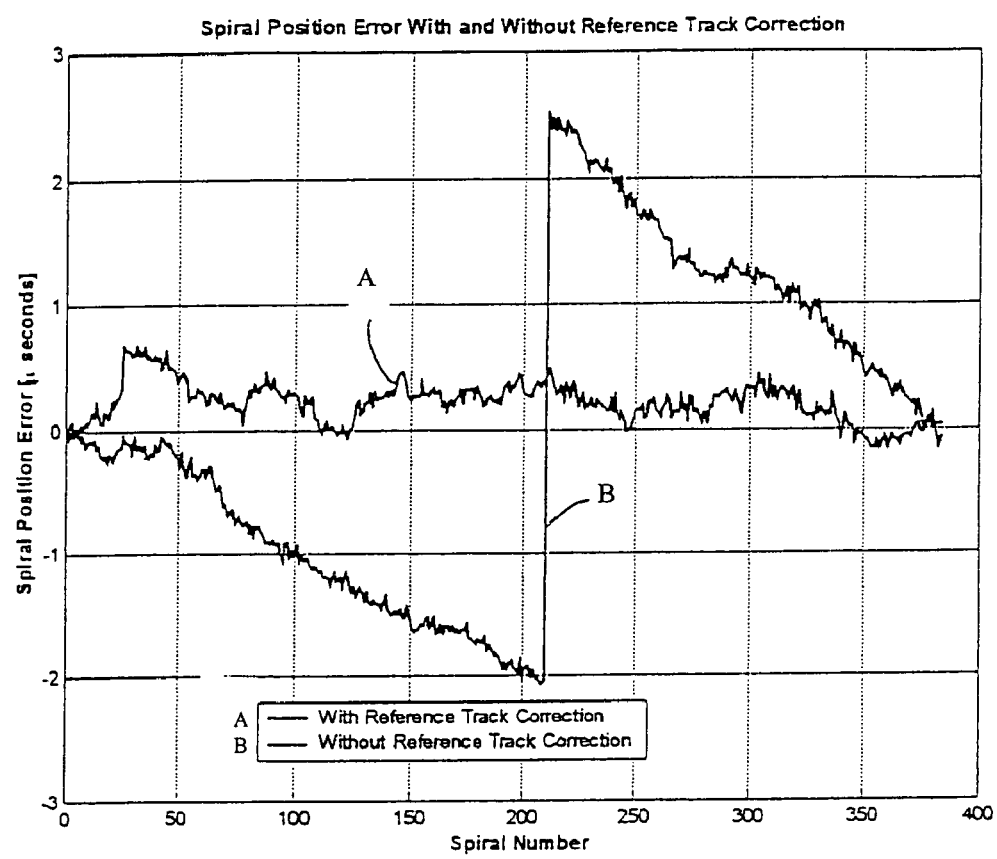
FIG. 19 : Spiral position error with and without reference track correction

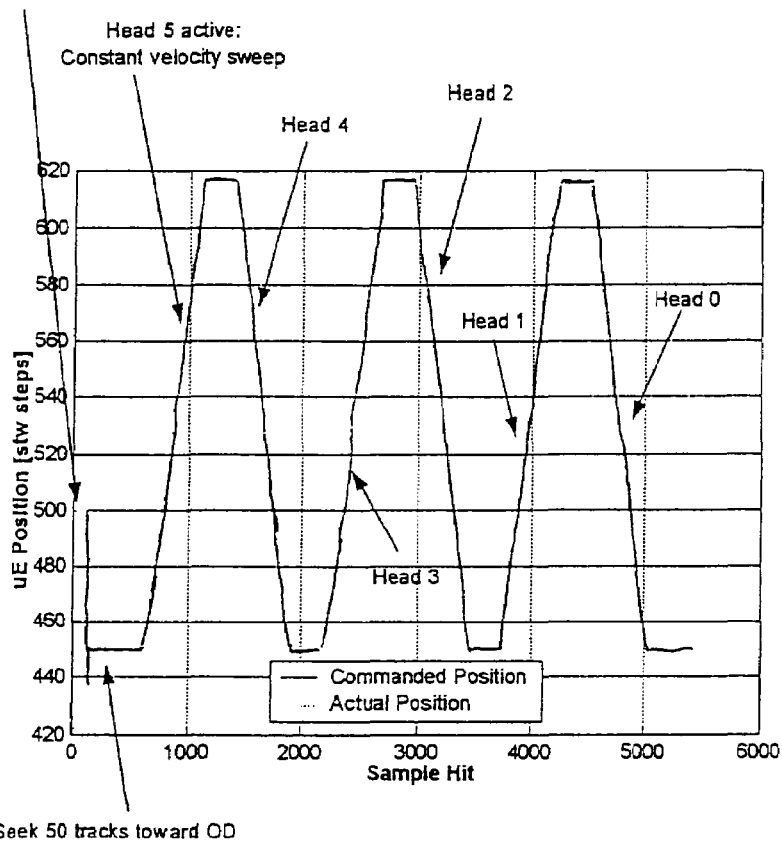
FIG. 20 : STW optical encoder position during the best head test
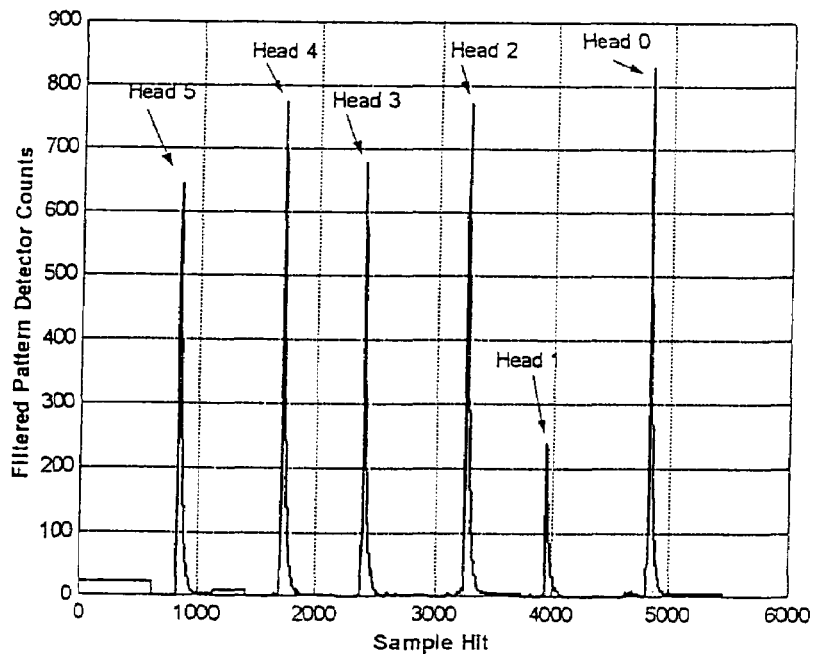
FIG. 21 : Reference track pattern detection counts during best head test

METHOD AND APPARATUS FOR PERFORMING BEST HEAD DETECTION IN A DISK DRIVE USING REFERENCE TRACKS

CROSS-REFERENCE TO RELATED APPLICATIONS

Priority is claimed from U.S. Provisional Patent Application Ser. No. 60/475,113 filed Jun. 2, 2003, which is incorporated herein by reference in its entirety; and priority is also claimed from U.S. Provisional Patent Application Ser. No. 60/475,141 filed Jun. 2, 2003, which is also incorporated herein by reference in its entirety.

FIELD OF THE INVENTION

The present invention relates generally to data storage devices, such as disk drives. More particularly, the present invention relates to a method and apparatus for performing best head detection in a disk drive using reference tracks.

BACKGROUND OF THE INVENTION

Computer disk drives store information on magnetic disks. Typically, the information is stored on each disk in concentric tracks that are divided into sectors. Information is written to and read from a disk by a transducer that is mounted on an actuator arm capable of moving the transducer radially over the disk. Accordingly, the movement of the actuator arm allows the transducer to access different tracks. The disk is rotated by a spindle motor at high speed which allows the transducer to access different sectors on the disk.

A conventional disk drive, generally designated 10, is illustrated in FIG. 1. The disk drive comprises a disk 12 that is rotated by a spin motor 14. The spin motor 14 is mounted to a base plate 16. An actuator arm assembly 18 is also mounted to the base plate 16.

The actuator arm assembly 18 includes a transducer 20 mounted to a flexure arm 22 which is attached to an actuator arm 24 that can rotate about a bearing assembly 26. The actuator arm assembly 18 also contains a voice coil motor 28 which moves the transducer 20 relative to the disk 12. The spin motor 14, voice coil motor 28 and transducer 20 are coupled to a number of electronic circuits 30 mounted to a printed circuit board 32. The electronic circuits 30 typically include a read channel chip, a microprocessor-based controller and a random access memory (RAM) device.

The disk drive 10 typically includes a plurality of disks 12 and, therefore, a plurality of corresponding actuator arm assemblies 18. However, it is also possible for the disk drive 10 to include a single disk 12 as shown in FIG. 1.

FIG. 2 is a functional block diagram which illustrates a conventional disk drive 10 that is coupled to a host computer 33 via an input/output port 34. The disk drive 10 is used by the host computer 33 as a data storage device. The host 33 delivers data access requests to the disk drive 10 via port 34. In addition, port 34 is used to transfer customer data between the disk drive 10 and the host 33 during read and write operations.

In addition to the components of the disk drive 10 shown and labeled in FIG. 1, FIG. 2 illustrates (in block diagram form) the disk drive's controller 36, read/write channel 38 and interface 40. Conventionally, data is stored on the disk 12 in substantially concentric data storage tracks on its surface. In a magnetic disk drive 10, for example, data is stored in the form of magnetic polarity transitions within each track. Data is "read" from the disk 12 by positioning the transducer 20 above a desired track of the disk 12 and sensing the magnetic polarity transitions stored within the track, as the track moves below the transducer 20. Similarly, data is "written" to the disk 12 by positioning the transducer 20 above a desired track and delivering a write current representative of the desired data to the transducer 20 at an appropriate time.

The actuator arm assembly 18 is a semi-rigid member that acts as a support structure for the transducer 20, holding it above the surface of the disk 12. The actuator arm assembly 18 is coupled at one end to the transducer 20 and at another end to the VCM 28. The VCM 28 is operative for imparting controlled motion to the actuator arm 18 to appropriately position the transducer 20 with respect to the disk 12. The VCM 28 operates in response to a control signal $i_{control}$ generated by the controller 36. The controller 36 generates the control signal $i_{control}$, for example, in response to an access command received from the host computer 33 via the interface 40 or in response to servo information read from the disk surface 12.

The read/write channel 38 is operative for appropriately processing the data being read from/written to the disk 12. For example, during a read operation, the read/write channel 38 converts an analog read signal generated by the transducer 20 into a digital data signal that can be recognized by the controller 36. The channel 38 is also generally capable of recovering timing information from the analog read signal. During a write operation, the read/write channel 38 converts customer data received from the host 33 into a write current signal that is delivered to the transducer 20 to "write" the customer data to an appropriate portion of the disk 12. As will be discussed in greater detail, the read/write channel 38 is also operative for continually processing data read from servo information stored on the disk 12 and delivering the processed data to the controller 36 for use in, for example, transducer positioning.

FIG. 3 is a top view of a magnetic storage disk 12 illustrating a typical organization of data on the surface of the disk 12. As shown, the disk 12 includes a plurality of concentric data storage tracks 42, which are used for storing data on the disk 12. The data storage tracks 42 are illustrated as center lines on the surface of the disk 12; however, it should be understood that the actual tracks will each occupy a finite width about a corresponding centerline. The data storage disk 12 also includes servo information in the form of a plurality of radially-aligned servo spokes 44 (or wedges) that each cross the tracks 42 on the disk 12. The servo information in the servo spokes 44 is read by the transducer 20 during disk drive operation for use in positioning the transducer 20 above a desired track 42 of the disk 12. Among other things, the servo information includes a plurality of servo bursts (e.g., A, B, C and D bursts or the like) that are used to generate a Position Error Signal (PES) to position the write head relative to a track's centerline during a track following operation. The portions of the track between servo spokes 44 are used to store customer data received from, for example, the host computer 33 and are referred to as customer data regions 46.

It should be understood that, for ease of illustration, only a small number of tracks 42 and servo spokes 44 have been shown on the surface of the disk 12 of FIG. 3. That is, conventional disk drives include one or more disk surfaces having a considerably larger number of tracks and servo spokes.

During the disk drive manufacturing process, a special piece of equipment known as a servo track writer (STW) is used to write the radially-aligned servo information which forms servo spokes 44. A STW is a very precise piece of equipment that is capable of positioning the disk drive's write head at radial positions over the disk surface, so that servo information is written on the disk surface using the disk drive's write head with a high degree of positional accuracy.

In general, a STW is a very expensive piece of capital equipment. Thus, it is desirable that a STW be used as efficiently as possible during manufacturing operations. Even a small reduction in the amount of data needed to be written by the STW per disk surface can result in a significant cost and time savings.

A STW is used to write servo information, by controlling the position of the disk drive's write head, on a disk surface in a circumferential fashion at each radius at which the disk drive's write head is positioned. During drive operation, the servo information is used to position the transducer of the disk drive over the appropriate data track and data sector of the disk. Accordingly, as the number of tracks per inch (TPI) increases, the amount of time necessary to write servo information increases. That is, the number of circumferential passes that a STW must make over a disk surface increases as TPI increases. Thus, unless more STWs are supplied, manufacturing times will continually increase as the TPI increases.

Instead of using a STW to write servo information in a circumferential fashion at each radius, the assignee of the present invention presently uses a STW to write servo information in a spiral fashion (in at least some of its disk drives). Specifically, the STW moves the write head in a controlled manner (e.g., at a constant velocity or along a velocity profile) from a location near the outer diameter of the disk to a location near the inner diameter of the disk (or visa-versa) as the disk spins.

FIG. 4 is a diagrammatic representation of a disk surface 210 having a first spiral of servo information 215 written thereon. The dashed line, identified by reference numeral 220, represents a track. The first spiral of servo information 215 may make multiple revolutions around the disk surface 210 (roughly two revolutions as shown in FIG. 4), but only crosses track 220 once.

FIG. 5 is a diagrammatic representation of a disk surface 210 having a first spiral of servo information 215 and a second spiral of servo information 225 written thereon. As shown in FIG. 5, the first and second spirals 215, 225 are interlaced with one another and are written approximately 180 degrees apart. Again, each spiral crosses track 220 only once.

Additional spirals of servo information may be written on the disk surface 210 depending upon the servo sample rate (that is, the number of servo samples required for each track 220 to keep the disk drive's transducer sufficiently on-track). For example, if a servo sample rate of 120 equally-spaced servo sectors per track was required, 120 equally-spaced spirals would be written on the disk surface 210. Accordingly, by writing servo information in a spiral fashion, the time necessary to write servo information on disk surface 210 using the STW is a function of the servo sample rate (i.e., the number of spirals of servo information to be written) rather than the number of tracks.

Referring again to FIGS. 4 and 5, the spirals of servo information are written by moving the disk drive's write head using the STW in a generally radial direction (more accurately, in a radial direction along an arc due to the position of the bearing assembly), while both the disk is spinning and the write head is enabled. The direction of disk rotation is indicated by an arrow as shown in each of FIGS. 4 and 5.

The disk drive's write head is enabled for nearly its entire stroke (i.e., from a position near the outer diameter to a position near the inner diameter or visa-versa) while under the control of the STW. As a result, a continuous spiral of servo information is written.

Each of the spirals of servo information includes sync marks written at fixed time intervals by the disk drive's write head. As mentioned above, the STW is used to move the disk drive's write head at some fixed velocity (or velocity profile) in a generally radial direction across the disk surface. If the time interval between sync marks is known and the velocity of the disk drive's write head is known, the distance between sync marks along a spiral can be determined. Specifically, the following formula may be applied: Distance=(STW Velocity)(Time), where Distance represents the radial distance between sync marks, Velocity represents the radial velocity of the disk drive's write head (under control of the STW) and Time represents the interval between sync marks.

For example, the interval between sync marks may be set at 1 microsecond, while the write head may be controlled to move at a radial velocity of 10 inches per second along its stroke. Thus, the radial distance between sync marks can be calculated to be 10 microinches along each spiral.

Each sync mark along a given spiral corresponds to a unique radius. Accordingly, the sync marks may be used to accurately position a transducer of a disk drive over the disk surface.

When writing spiral servo information onto a disk surface, the STW measures the angular position of the disk drive's actuator using an optical encoder that is concentric with the actuator's axis of rotation. The STW simultaneously tracks the amount of disk rotation using a stationary head (referred to as the clock head) to sense a timing reference track (i.e., a clock track) on the disk surface. The clock track is equivalent to an encoder for disk rotation. The process of writing spirals entails sweeping the actuator through a prescribed angle $\theta$ for a given amount of disk rotation $\omega$ while a pattern (e.g., as described above) is written by the disk drive's write head as shown in FIG. 6.

The STW also includes a digital signal processor (DSP) which, during spiral write, samples the optical encoder at a rate which is locked (via the clock track) to a set amount of disk rotation $\omega_0$. Doing so makes the desired amount of sweep per spin angle equivalent to a desired amount of sweep per sample hit $\theta(k)$. This provides a number of advantages, the most relevant being that the position profile $\theta(k)$ can be pre-calculated as a function of sample hit for any desired spiral shape. A simple case, shown in FIG. 6, is where the actuator is swept in at a constant velocity: $\theta(k)-\theta(k-1)=\theta_0$. As illustrated, the position of the disk drive's write head is at sample hit k=1. This position is arrived at by moving from the initial radius R(0) to radius R(1) as the disk rotates through the angle $\omega_0$.

If, after a further rotation of $\omega_0$, the actuator has swept through another increment $\theta_0$, then the disk drive's write head should arrive at the point on the spiral labeled k=2. This is illustrated in FIG. 7.

When writing spirals, the optical encoder signal is fed back and compared with a desired spiral profile at each sample hit. The error between the measured spiral profile and desired spiral profile is used by the STW servo system to compute a torque-based correction applied to the actuator.

Spiral profile tracking performance and disturbance rejection are both considered in the design of the STW servo algorithm.

Spiral Runout

There are, unfortunately, disturbances during spiral writing that are not observable by the STW optical encoder used to sense actuator position. Significant among such disturbances are dimension changes in the actuator arm, disk, and push-pin damping material that are primarily due to thermal phenomena during spiral writing. These dimension changes affect the relative geometry between the disk and actuator, and thereby distort the spiral shape away from that desired. One possible manifestation of this effect is shown in FIG. 8 where the drive is shown writing the $N^{th}$ spiral adjacent the $1^{st}$ spiral.

Specifically, during the time interval between writing the $1^{st}$ spiral and $N^{th}$ spiral, the actuator pivot to write head distance has increased. The effect of this geometry-change places the $N^{th}$ spiral at a distance from the $1^{st}$ spiral that is greater than that desired even if the STW positioning system precisely executes the prescribed sweep angle per sample hit.

The assignee of the present invention has developed a technique for self-servo writing using the spiral servo information written onto the disk surface. In one case, the final servo patterns written by the drive appear substantially identical to traditional servo patterns.

At any given spiral servo track, correctly placed spirals exhibit an exact spiral-to-spiral spacing and the drive drive's servo system utilizes this as part of a technique to position the actuator. Spacing error of the spirals around the revolution, or spiral runout, can result in the degradation of drive position error while track following. If the spiral spacing error is extreme, the drive will fail to self-write.

FIG. 9 shows spiral runout resulting from drift in the spiral start location with respect to the disk surface. In FIG. 9, the disk has been "unwrapped" so that disk rotation/spin time is shown as increasing along the x-axis while actuator position/sweep angle increases along the y-axis. As illustrated, an outer diameter (OD) shift in spiral start is clearly seen to cause a spacing/timing shift in the spirals in the "downtrack" direction, which is constant across all radii. It should be noted that FIG. 9 illustrates the effect of a constant, incremental drift of each spiral with respect to the previous spiral.

FIG. 10 plots the resulting spiral runout (cumulative downtrack shift) due to the shift shown in FIG. 9. Each spiral starts at the same amount of offset relative to the previous spiral, but this accumulates into an increasingly larger offset from the desired location. Clearly, this causes a large discontinuity in the runout between the first-written spiral and last-written spiral, which leads to a similar, undesirable discontinuity in the drive position error signal. While the spirals can be written in a different sequence to "smooth" the discontinuity (see, U.S. patent application Ser. No. 10/788,242 entitled "Method And Apparatuses For Writing Spiral Servo Patterns Onto A Disk Surface" filed Feb. 26, 2004, which is incorporated herein by reference), the spiral runout may still have a maximum magnitude equal to the maximum offset from desired. As illustrated in FIG. 9, this runout signature will be constant at all radii when the geometrical distortion is independent of radius.

If the inner diameter (ID) drift is not the same as the OD drift, then the spiral runout is not constant across all radii. FIG. 11 illustrates this case. Here the OD and ID have drifted differently, causing both an offset and slope error in each spiral. While sequentially-written spirals will have the same discontinuous signature as before, the magnitude of the discontinuity will change from OD to ID.

In view of the above, it would be desirable to develop a method for reducing spiral runout due to, e.g., the aforementioned dimension changes. Furthermore, it would be beneficial to pick a best read head, among a plurality of read heads, to be used in conjunction with reducing the spiral runout.

SUMMARY OF THE INVENTION

The present invention is designed to meet some or all of the aforementioned, and other, needs.

The present invention is directed to a method and apparatus for performing best head detection in a disk drive using reference tracks.

In one embodiment, a disk drive includes a plurality of disk surfaces. Each disk surface has a read head and a write head associated therewith. A servo track writer is provided for moving each write head and each read head relative to their corresponding disk surfaces. Reference tracks are written onto each of the disk surfaces. The reference track from each disk surface is read by its corresponding read head to determine a best read head. In one embodiment, each reference track includes reference track patterns and the best read head is the read head that detects the most patterns.

In one embodiment, the servo track writer sweeps each read head across its corresponding reference track as the reference track is being read. In one embodiment, each read head is swept across its reference track at a velocity corresponding to a velocity at which a reference track is read during a spiral servo write operation.

Other embodiments, objects, features and advantages of the invention will be apparent from the following specification taken in conjunction with the following drawings.

BRIEF DESCRIPTION OF THE DRAWINGS

FIG. 6 is a diagrammatic representation of a spiral prescribed as a function of sample hit with the disk drive's write head at sample k=1;

FIG. 7 is a diagrammatic representation of a spiral prescribed as a function of sample hit with the disk drive's write head at sample k=2;

FIG. 8 is a diagrammatic representation of a spiral spacing error due to geometric change in actuator pivot to write head distance;

FIG. 9 is a diagrammatic representation of spiral position error due to OD misalignment of spirals;

FIG. 10 is a diagrammatic representation of spiral runout due to OD accumulation of alignment error;

FIG. 11 is a diagrammatic representation of spiral position error due to OD and ID misalignment of spirals;

FIG. 12 is a block diagram representation of a reference track pattern demodulation circuit;

FIG. 13 is a diagrammatic representation of reference track distortion due to geometric change in actuator pivot to write head distance;

FIG. 14 is a diagrammatic representation of a square wave compared to a reference track pattern that may be used in connection with the present invention;

FIG. 15 is a graphical representation of detected reference track counts showing both raw counts and filtered counts;

FIG. 16 is a graphical representation illustrating exemplary OD reference track motion and exemplary ID reference track motion;

FIG. 17 is a graphical representation of an RLS reference track filter acting on a noisy data set;

FIG. 18 is a simplified block diagram illustrating reference track correction applied to a spiral servo loop;

FIG. 19 is a graphical representation illustrating spiral position error both with and without reference track correction;

FIG. 20 is a graphical representation of STW optical encoder position versus DSP sample hit time; and, FIG. 21 is a graphical representation of reference track pattern detection counts during the best head test of the present invention.

DETAILED DESCRIPTION OF THE PREFERRED EMBODIMENT

Figure 1:
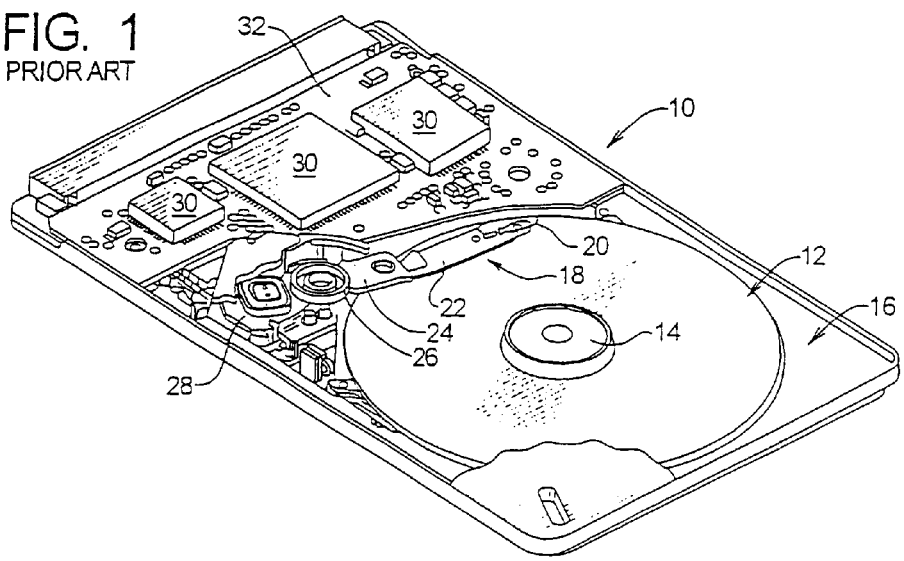
FIG. 1 is a diagrammatic representation illustrating a conventional disk drive with its top cover removed.
Figure 2:
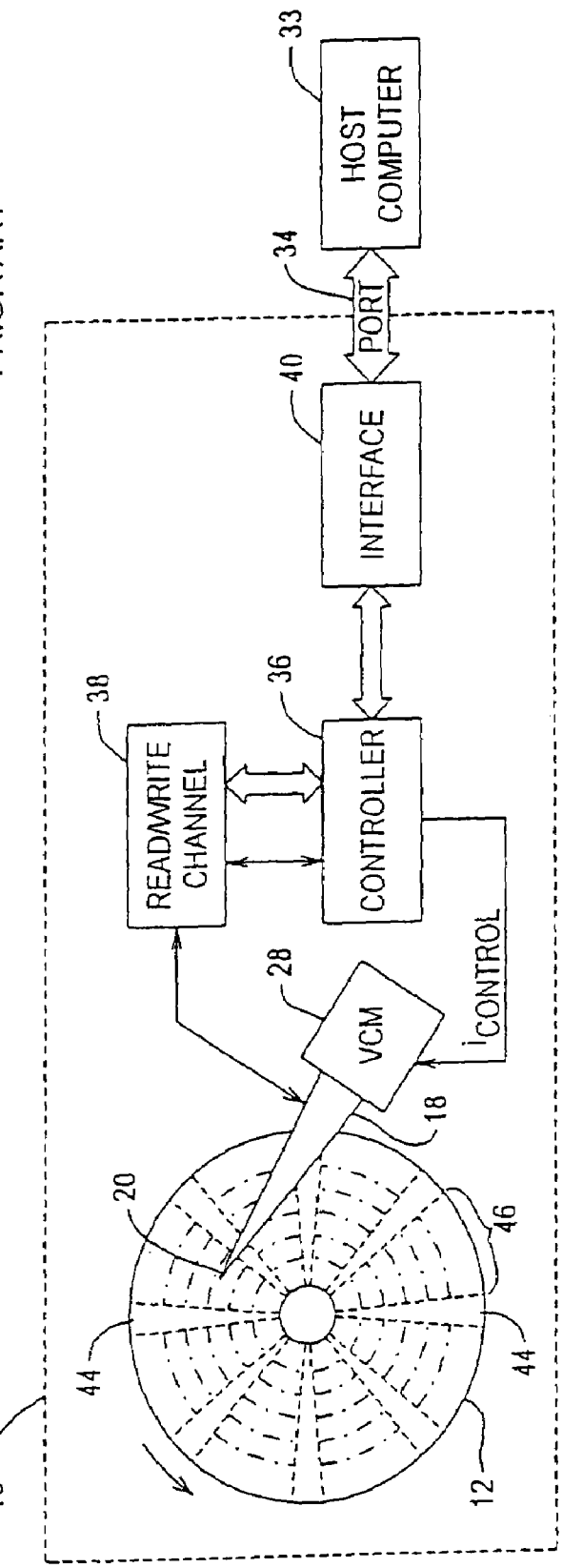
FIG. 2 is a functional block diagram which illustrates a conventional disk drive that is coupled to a host computer via an input/output port.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

U.S. patent application Ser. No. 10/859,916 entitled "Method And Apparatus For Modifying Spiral Profile Using Reference Tracks Written Onto A Disk Surface Of A Disk Drive" filed on even date herewith is incorporated by reference. The present invention may be used in connection with embodiments described in the above-identified patent application. Accordingly, information relating to such application is provided below. Following such information, a detailed description of the present invention is provided.

Specifically, the aforementioned application describes a method and apparatus for mitigating spiral runout through the use of data head reference tracks against which spiral placement can be tracked. Among other things, the technique is to "pin" the same points on all written spirals to the locations where reference tracks are detected. Spiral profiles are defined as a function of the STW positioner location θ(k), but ultimately the profile should be determined as a function of the disk drive's head radius versus disk spin. Reference tracks allow the position of the disk drive's head to be charted as a function of the STW optical encoder. This, in turn, allows the desired profile to be shifted to match the observed change in location where the disk drive's head intercepts the reference track. Doing so pins specific points on each spiral so that they are placed consistently relative to the reference tracks and, consequently, the disk surface.

Reference Track Pattern and Detector

Each reference track is nearly a simple square wave. The playback of this pattern is detected using a standard receiver topology as shown in FIG. 12. The read head playback is compared against an expected pattern and, when a large enough section matches the expected pattern, a threshold is crossed, triggering a counter to be incremented. A DSP is able to read the number of detections that occur in the interval between reading, since each reading resets the counter. Note that the clock playback is used to sample the read head playback, rather than doing some sort of sample clock recovery from the data playback. This affords a simple implementation of the detector, but may leave the detection susceptible to problems caused by the dimension changes described earlier. Their effect is depicted in FIG. 13.

As the actuator pivot to write head distance changes, the read head will intercept reference track transitions at points that "slide" with respect to the clock track. If the reference track transitions are intercepted so that they are coincident at the detector with the clock track transitions, then noise can make the playback appear random, arriving on either side of the clock edge, causing a precipitous drop in successful detections. To mitigate this effect, the simple square wave reference pattern is modified so that sections of constant period are separated by special elongated periods, as illustrated in FIG. 14.

This allows only a small percentage of reference cycles to be coincident with the clock track at any given time. The maximum achievable number of detections is decreased slightly, but precipitous drops in successful detections no longer occur, due to relative shifts between clock and reference track reception.

Reference Track Based Profile Correction

During the interval between each DSP servo interrupt, the number of reference pattern detections is counted. When the read head is over the reference track, the number of detections increases significantly compared with the number of false detections occurring outside the reference track.

FIG. 15 plots the raw counts (curve 1502) as a function of servo interrupt. The raw count sequence is low-pass filtered (curve 1504) and the maximum filter count value is used as the reference track "center." Due to the phase-lag of the low pass filter, this "center" is shifted from the true center. This shift is unimportant because it is consistent for each pass over the reference track and the correction of the spiral profile uses only the relative change in reference location from one pass to the next. The change in reference track "center" observed as spirals are written is a measure of the shift in disk surface relative to the external STW optical encoder. The spiral profile, which is controlled as a function of optical encoder counts, can be adjusted by the detected reference track shift, so that the spiral profile remains consistent relative to the reference tracks and, thus, the disk surface.

Reference Track Trajectories

In one embodiment, the spiral position profile is adjusted using both an OD reference track and ID reference track. It should be understood that the technique described herein is not limited to using an OD reference track and an ID reference track. That is, more reference tracks can be used. However, it is believed that two reference tracks are sufficient to reduce spiral runout at all radii.

FIG. 16 shows the detected shift of both the OD reference track and ID reference track versus each spiral written. Both the OD reference track and ID reference track drift close to 100 STW tracks with respect to the STW optical encoder.

Figure 3:
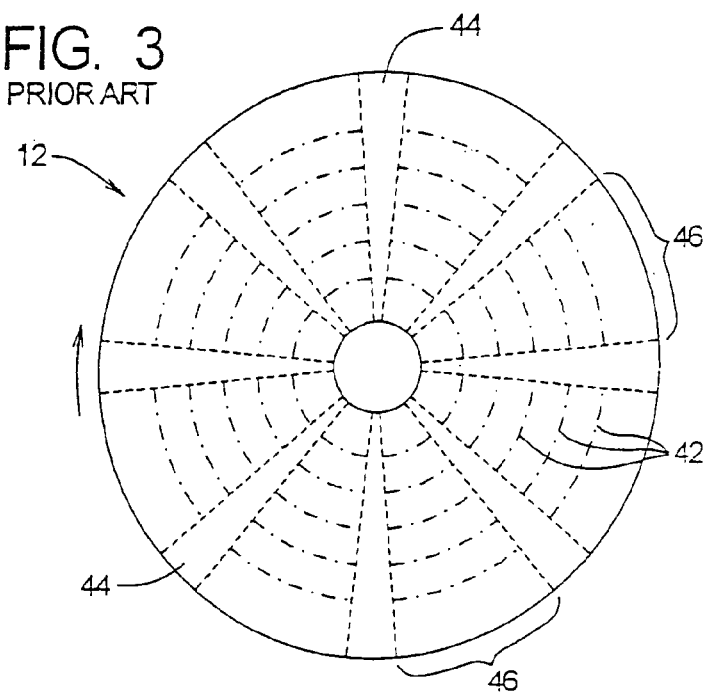
FIG. 3 is a diagrammatic representation of a top view of a magnetic storage disk illustrating a typical organization of data on a disk surface.
Figure 4:
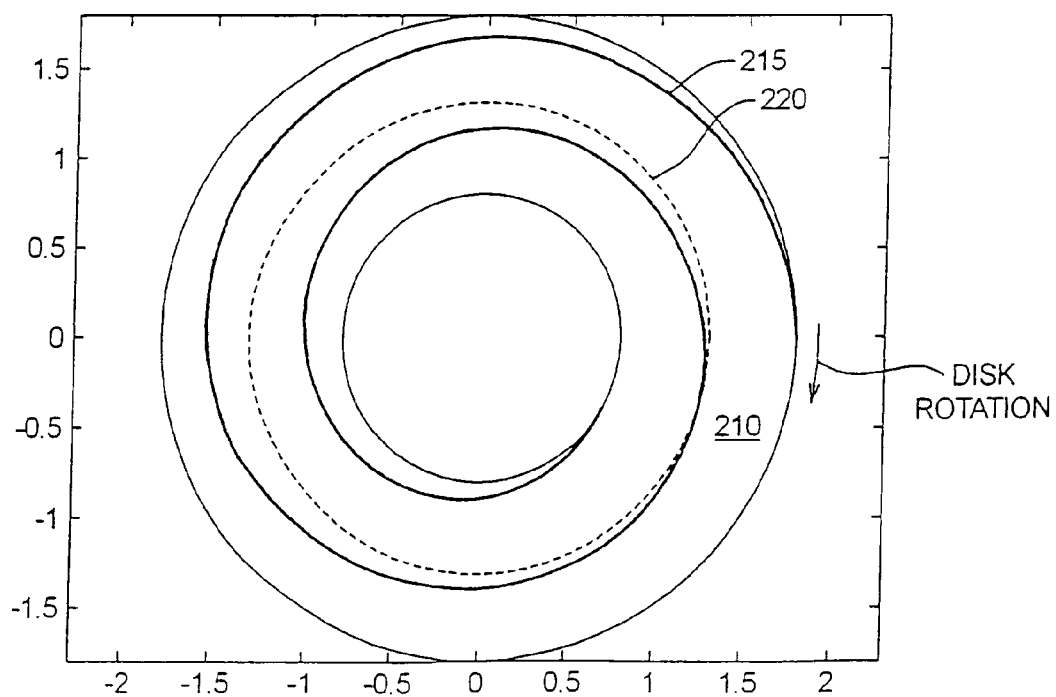
FIG. 4 is a diagrammatic representation of a disk surface having a spiral of servo information written thereon, along with a circular data storage track.
Figure 5:
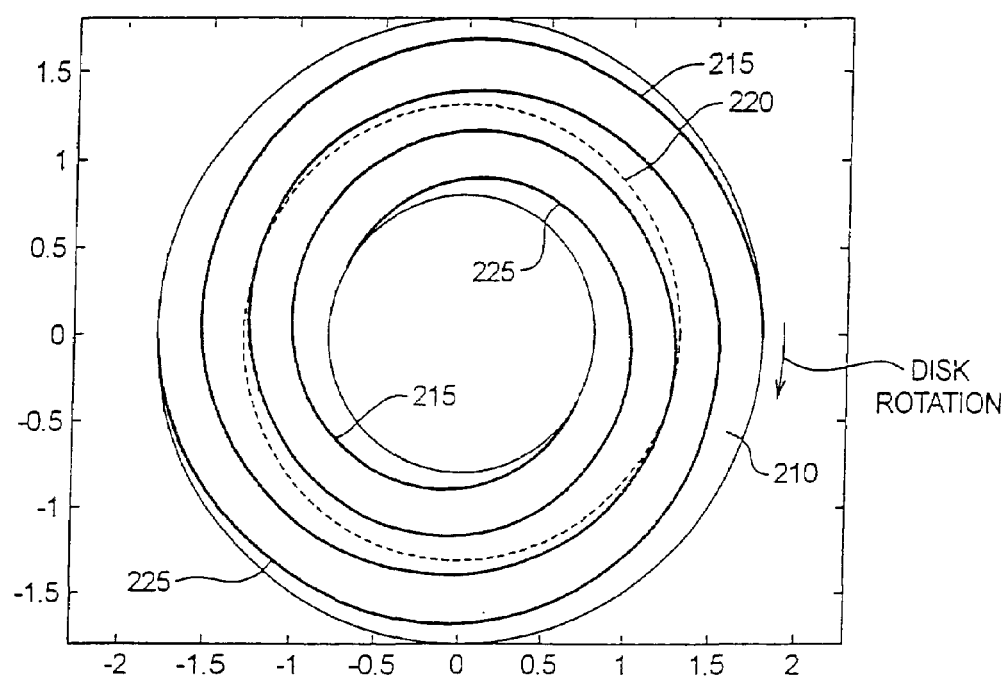
FIG. 5 is a diagrammatic representation of a disk surface having two spirals of servo information written thereon, along with a circular data storage track.

Without correction, this amount of drift can result in spiral runout so large that the drive may not be able to track-follow on spirals well enough to perform self-servo write operations (e.g., to write final servo patterns, so that this disk surface is formatted in a fashion similar to the disk surface shown in FIG. 3). It is also clear from this figure that the OD reference track and the ID reference track drift differently, confirming the need for at least two reference tracks.

The consistency of reference track detection can be severely degraded by read head playback amplitude, electronics noise, detector clock phase, etc. In volume production, it is typical to see "noisy" reference track trajectories. In order to keep this detection noise from degrading the spiral profile correction, a special filtering scheme is used on the sequence of reference track shifts.

FIG. 17 shows an example of reference track motion with a noise spike. The filtering scheme uses Recursive Least Squares (RLS) on the change in reference track position in order to predict the slope of the trajectory. The estimate of trajectory slope is used as a rate limiter on the unfiltered trajectory, and any change in reference location larger than the RLS estimated change is clamped at the RLS limit. Because an RLS algorithm with forgetting factor is used, the bound is large at both the beginning of the spiral write and also after noise spikes. The bounds tighten as more samples with consistent slope are recorded. The convergence rate of the RLS filter has been tuned to provide for expected reference track motion while filtering out obvious noise. Finally, the sequence of detected and clamped reference track shifts is also low-pass filtered to smooth the spiral profile correction (curve D).

Spiral Profile Correction

Once filtered versions of both the OD reference track shift and the ID reference track shift have been obtained, the spiral position profile can be modified. FIG. 18 is a simplified block diagram representation of the reference track correction to the spiral servo loop.

The reference track demodulation block and RLS/Low pass filter block have been discussed above. The profile correction generator uses the filtered reference track shifts to generate a vector of correction values, which are then added to a table of spiral profile positions before being passed to the compensator. In one embodiment, a simple offset and slope correction generator is used. The OD reference track provides the profile correction vector offset, while the relative change between the ID reference track and the OD reference track forms the profile correction vector slope. It is believed that this simple linear fit is sufficient for reducing spiral runout at all radii. It should be understood that the techniques described herein are not limited to the above-described profile correction generator. For example, a more sophisticated correction generator, such as a polynomial fit, may also be used.

FIG. 19 shows spiral runout for sequentially-written spirals around 1 revolution both with and without reference track correction. The reference tracks correct for the spiral drift, removing the spiral position error around the revolution and canceling the large discontinuity.

In one embodiment, the reference tracks are circular tracks written onto the disk surface by the disk drive's write head, wherein a first reference track is written near the inner diameter of the disk surface and the second reference track is written near the outer diameter of the disk surface. Furthermore, the servo track writer is used to position the write head when writing the first and second reference tracks. It should be understood, however, that one or more reference tracks may be written onto the disk surface by the disk drive's write head without being positioned by the servo track writer. It should also be understood that reference tracks may be provided on the disk surface via other means, e.g., printed media or etching processes. It should also be understood that the reference tracks do not necessarily have to be circular.

It should be noted that initial positions of the reference tracks relative to the servo track writer may be stored in memory at the time of writing the reference tracks. However, if delays occur between the time of writing the reference tracks and the time of writing the first spiral of servo information, initial positions of the reference tracks relative to the servo track writer may be determined just prior to writing the first spiral of servo information onto the disk surface. In another embodiment, the initial positions of the reference tracks relative to the servo track writer are determined just after writing the first spiral (or other spirals) of servo information.

In one embodiment, spiral servo information is written by the write head as the servo track writer moves the write head in a first direction (i.e., either from OD to ID or visa-versa) and the read head reads reference tracks as the servo track writer moves the read head in a second direction (i.e., from ID to OD or visa versa). Since spiral servo information is generally written in one direction from a radial starting point either at the OD or the ID, reading reference tracks when returning to the radial starting point is considered to be efficient because one or more extra cycles across the stroke do not have to be provided to read the reference tracks. Furthermore, there is less of a delay (and, hence, less opportunity for thermal changes and the like) between the time of reading the reference tracks to adjust the spiral profile and the time of writing the next spiral of servo information.

It should be noted that the frequency of the pattern in the reference tracks is preferably different than the frequency of the spirals of servo information.

Best Head Detection

As described above, during a spiral servo write process, a read head in the disk drive reads reference track patterns written on the disk. For multi-head drives, the opportunity exists to pick the best head for reading a reference track, rather than using a default read head. The quality of the spiral servo information written onto the disk surface and, ultimately, process yield can benefit from best read head detection when the disk drive is at the STW.

According to the present invention, a reference track is written onto each of the disk surfaces of the disk drive. In one embodiment, each reference track is located near the OD of its corresponding disk surface (although other positions are possible and anticipated). Prior to writing any spiral servo information onto any of the disk surfaces, the STW moves the disk drive's read heads over their corresponding reference tracks at a constant velocity (or the velocity that is used when reading reference tracks during the spiral servo writing operation). Before (or after) each pass over the reference track location, the active read head is switched. Enough passes are made so that each read head is tested at least once.

FIG. 20 is a graphical representation of STW optical encoder position versus DSP sample hit (time) during the best head detection algorithm. The data shown in FIG. 20 represents a 6-headed drive, wherein each read head was swept over its corresponding reference track once. The constant velocity matches the velocity used when reading reference tracks during the spiral servo writing operation.

As each read head sweeps over its reference track location, detected reference pattern counts associated with each head accumulate. FIG. 21 is a graphical representation of the filtered output of the reference track detection circuit. As shown in FIG. 21, some heads find more pattern counts than others. This may be due to, for example, read head playback amplitude, read head playback quality and electronics noise, among other things. Without a best read head detection algorithm, the default head could resemble head 1 in FIG. 21, which demonstrates the motivation for a best head algorithm. Using a simple maximum count check, head 0 in FIG. 21 is determined to be the best read head. Accordingly, spiral servo information will be written onto the disk surface associated with head 0.

Again, the best read head detection algorithm attempts to mimic a spiral write reference track search (for at least one reference track on each disk surface). Preferably, at least one reference track that is used for the best read head detection test is used during the spiral servo writing operation. The best read head detection test uses the same search velocity, same reference pattern detection circuit and the same reference track filter as used during spiral servo write operations. Accordingly, the operating conditions during the best read head detection test and the spiral servo write operation are substantially the same.

In one embodiment, each disk surface includes a first reference track near its OD and a second reference track at its ID, and both the first and second reference tracks are used to determine reference pattern matches for best read head detection. If more than two reference tracks are provided, they may be used in the same manner. In another embodiment, although a plurality of reference tracks are written on one or more of the disk surfaces, only one reference track is used per disk surface.

In one embodiment, the best head detection test is performed with each read head sweeping past its corresponding reference track in the same direction. For example, this direction could be the same direction (or opposite direction) to that used during spiral servo write (if reference patterns are read in only one direction during spiral servo write operations). In another embodiment, the best head detection test is performed with some read heads moving in a first direction over their corresponding reference tracks and other read heads moving in a second direction (different from the first direction) over their corresponding reference tracks. For example, alternating active read heads may be moved in different directions.

Once the best read head has been determined, it may be flagged as the best read head for use in other disk drive operations. It should be noted that the best read head (in combination with its corresponding write head) may not be the "best" with respect to bit error rate, track misregistration or other parameters.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
providing a plurality of disk surfaces each having a read head and a write head associated therewith;
writing a reference track on each of the disk surfaces;
performing a best read head test, wherein the best read head test includes reading said reference tracks;
selecting from one of the plurality of disk surfaces onto which to write spiral servo information based upon the best read head test.

2. The method of claim 1 further including:
providing a servo track writer for moving each write head and each read head relative to each corresponding disk surface, wherein the servo track writer sweeps each read head across its corresponding reference track as the reference track is being read.

3. The method of claim 2, wherein spiral servo information is not written onto the other disk surfaces.

4. The method of claim 2, wherein one of the plurality of read heads is swept across its reference track in a first direction when its reference track is being read and another of the plurality of read heads is swept across its reference track in a second direction that is different from the first direction when its reference track is being read.

5. The method of claim 2, wherein all of the read heads are swept across their corresponding reference tracks in one direction when their corresponding reference tracks are being read.

6. The method of claim 2, wherein each read head is swept across its reference track at a constant velocity when its reference track is being read.

7. The method of claim 2, wherein each read head is swept across its reference track at a velocity corresponding to a velocity at which a reference track is read during a spiral servo write operation.

8. The method of claim 2, wherein each read head is tested sequentially to determine whether it is the best read head.

9. The method of claim 2, wherein each reference track is written near an outer diameter of its corresponding disk surface.

10. The method of claim 2, wherein each reference track includes reference track patterns and the best read head is the read head that detects the most patterns.

11. The method of claim 1, wherein spiral servo information is not written onto the other disk surfaces.

12. The method of claim 1, wherein one of the plurality of read heads is swept across its reference track in a first direction when its reference track is being read and another of the plurality of read heads is swept across its reference track in a second direction that is different from the first direction when its reference track is being read.

13. The method of claim 1, wherein all of the read heads are swept across their corresponding reference tracks in one direction when their corresponding reference tracks are being read.

14. The method of claim 1, wherein each read head is swept across its reference track at a constant velocity when its reference track is being read.

15. The method of claim 1, wherein each read head is swept across its reference track at a velocity corresponding to a velocity at which a reference track is read during a spiral servo write operation.

16. The method of claim 1, wherein each read head is tested sequentially to determine whether it is the best read head.

17. The method of claim 1, wherein each reference track is written near an outer diameter of its corresponding disk surface.

18. The method of claim 1, wherein each reference track includes reference track patterns and the best read head is the read head that detects the most patterns.

19. The method of claim 18, wherein a count of detected patterns is accumulated for each read head, and the best read head accumulates the largest count.

20. The method of claim 19, wherein the count is a filtered output of a reference track detection circuit.

21. In a disk drive that includes multiple disk surfaces and multiple transducers that each include a read head and a write head that read from and write to a corresponding disk surface, a method for writing servo information to the disk surfaces, comprising:

providing a reference track on each disk surface;
reading the reference tracks using the read heads to generate test data;
determining a best read head from the read heads using the test data, wherein the write head corresponding to the best read head is selected for writing spiral servo information and the other write heads are deselected for writing spiral servo information; then
reading the reference track from the disk surface corresponding to the best read head using the best read head to generate timing information;
writing spiral servo information to the disk surface corresponding to the best read head using the write head that corresponds to the best read head and the timing information; then
reading the spiral servo information using the best read head to generate position information; and
self-servo writing final servo patterns to the disk surfaces using the write heads and the position information to position the write heads.

22. The method of claim 21, wherein providing the reference tracks includes using the write heads and a servo track writer that is external to the disk drive to position the write heads.

23. The method of claim 21, wherein providing the reference tracks includes printing the reference tracks on the disk surfaces without using the write heads.

24. The method of claim 21, wherein the reference tracks are located near inner diameters of the disk surfaces.

25. The method of claim 21, wherein the reference tracks are located near outer diameters of the disk surfaces.

26. The method of claim 21, wherein reading the reference tracks includes sweeping the read heads across the reference tracks such that the read heads sequentially read the reference tracks and each read head reads its corresponding reference track during a separate sweep.

27. The method of claim 26, wherein each read head reads its corresponding reference track during a single sweep.

28. The method of claim 26, wherein the sweeps are in the same direction.

29. The method of claim 26, wherein the sweeps are in alternating directions.

30. The method of claim 21, wherein reading the reference tracks includes each read head reading first and second reference tracks from its corresponding disk surface.

31. The method of claim 30, wherein the first reference tracks are located near inner diameters of the disk surfaces, and the second reference tracks are located near outer diameters of the disk surfaces.

32. The method of claim 21, wherein reading the reference tracks includes sweeping the read heads across the reference tracks at a constant velocity.

33. The method of claim 32, wherein reading the reference track using the best read head to generate the timing information includes sweeping the best read head across the reference track at the constant velocity.

34. The method of claim 21, wherein determining the best read head includes determining which read head reads the most reference patterns from its corresponding reference track.

35. The method of claim 34, wherein determining which read head reads the most reference patterns from its corresponding reference track includes accumulating a count of detected reference patterns for each read head.

36. The method of claim 21, wherein writing the spiral servo information includes using a servo track writer that is external to the disk drive to position the write head that corresponds to the best read head.

37. The method of claim 21, wherein reading the reference tracks includes using a reference pattern detection circuit and a reference track filter, and reading the reference track using the best read head to generate the timing information includes using the reference pattern detection circuit and the reference track filter.

38. The method of claim 21, including flagging the best read head for other disk drive operations.

39. The method of claim 21, excluding writing the spiral servo information to the disk surfaces that do not correspond to the best read head.

40. The method of claim 21, excluding self-servo writing final servo patterns to the disk surfaces using position information from the disk surfaces that do not correspond to the best read head.

41. In a disk drive that includes multiple disk surfaces and multiple transducers that each include a read head and a write head that read from and write to a corresponding disk surface, a method for writing servo information to the disk surfaces, comprising:

providing a reference track on each disk surface;
reading the reference tracks using the read heads to generate test data;
determining a best read head from the read heads using the test data, wherein the write head corresponding to the best read head is selected for writing spiral servo information and the other write heads are deselected for writing spiral servo information; then
reading the reference track from the disk surface corresponding to the best read head using the best read head to generate timing information and a servo track writer that is external to the disk drive to position the best read head;
writing spiral servo information to the disk surface corresponding to the best read head using the write head that corresponds to the best read head and the timing information and the servo track writer to position the write head; then
reading the spiral servo information from the disk surface that corresponds to the best read head using the best read head to generate position information, wherein the other disk surfaces are devoid of spiral servo information; and
self-servo writing final servo patterns to the disk surfaces using the write heads and the position information to position the write heads.

42. The method of claim 41, wherein providing the reference tracks includes using the write heads and the servo track writer.

43. The method of claim 41, wherein providing the reference tracks includes printing the reference tracks on the disk surfaces without using the write heads and without using the servo track writer.

44. The method of claim 41, wherein reading the reference tracks includes sweeping the read heads across the reference tracks such that the read heads sequentially read the reference tracks and each read head reads its corresponding reference track during a separate sweep.

45. The method of claim 44, wherein the sweeps are in the same direction.

46. The method of claim 44, wherein the sweeps are in alternating directions.

47. The method of claim 41, wherein reading the reference tracks includes each read head reading first and second reference tracks from its corresponding disk surface, the first reference tracks are located near inner diameters of the disk surfaces, and the second reference tracks are located near outer diameters of the disk surfaces.

48. The method of claim 41, wherein reading the reference tracks includes sweeping the read heads across the reference tracks at a constant velocity, and reading the reference track using the best read head to generate the timing information includes sweeping the best read head across the reference track at the constant velocity.

49. The method of claim 41, wherein determining the best read head includes determining which read head reads the most reference patterns from its corresponding reference track by accumulating a count of detected reference patterns for each read head.

50. The method of claim 41, wherein reading the reference tracks includes using a reference pattern detection circuit and a reference track filter, and reading the reference track using the best read head to generate the timing information includes using the reference pattern detection circuit and the reference track filter.

* * * * *